June 10, 1930.  R. C. HUNTLEY  1,762,630
ADJUSTABLE CHAIR
Filed Feb. 27, 1929

INVENTOR
Reginald C. Huntley
BY Chappell Earl
ATTORNEYS

Patented June 10, 1930

1,762,630

UNITED STATES PATENT OFFICE

REGINALD C. HUNTLEY, OF STURGIS, MICHIGAN

ADJUSTABLE CHAIR

Application filed February 27, 1929. Serial No. 343,035.

The main objects of this invention are:

First, to provide in a chair of the office type an improved leg or pedestal structure which may be made of comparatively light materials and at the same time is very strong and rigid.

Second, to provide a structure having these advantages in which the parts are quickly and easily assembled by workmen having little skill in the art.

Objects pertaining to details and economies of my invention will definitely appear from the description to follow. The invention is defined in the claims.

A structure which embodies the features of my invention is clearly illustrated in the accompanying drawing in which.

Figure 1:
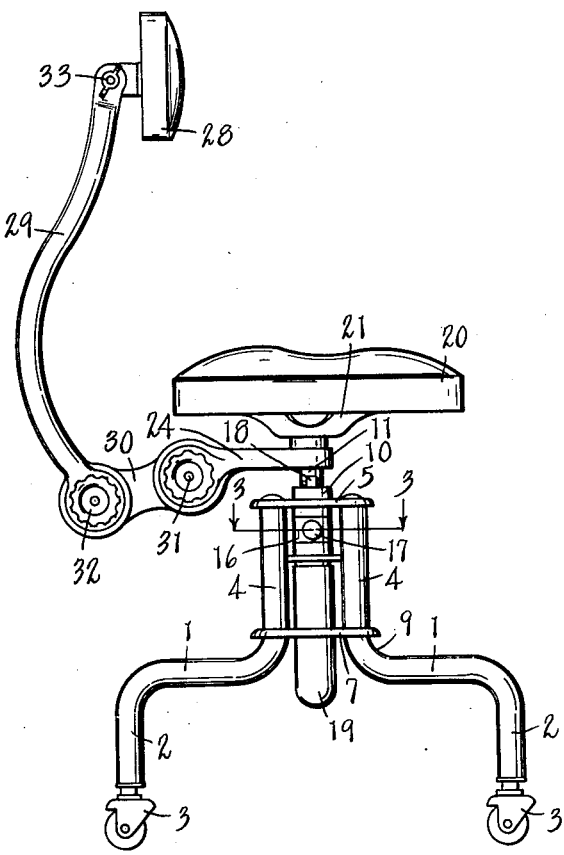
Fig. 1 is a side elevation of a chair of the office type embodying the features of my invention.
Figure 3:
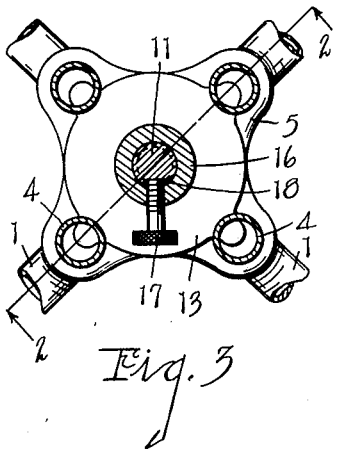
Fig. 3 is a fragmentary view partially in section on line 3—3 of Figs. 1 and 2.
Figure 2:
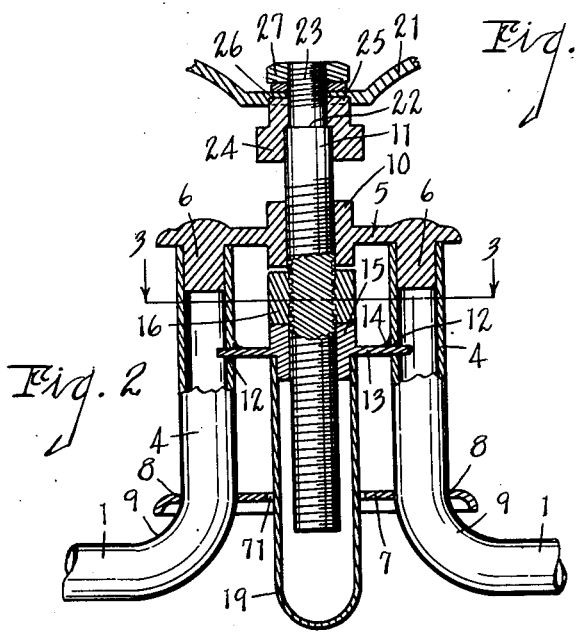
Fig. 2 is a fragmentary view partially in vertical section on line 2—2 of Fig. 3.

Referring to the drawing, the structure illustrated comprises four legs 1 formed of tubes or pieces of pipe bent into angular form of general Z shape, the lower ends 2 being provided with casters 3. The upper ends 4 of the legs are disposed in approximately parallel relation and are connected at their upper ends by means of the head member 5 which is preferably a casting provided with downwardly projecting lugs 6 driven into the upper ends of the legs. The legs are further connected by a tie plate 7 which has holes 8 therein through which the legs are arranged, this tie plate being supported by the bends forming the upper angles 9 of the legs. This tie plate is preferably a stamping.

The head member is provided with a central bearing 10 for the threaded seat supporting spindle 11. The legs have transverse slots 12 intermediate the head member and tie plate adapted to receive the spindle supporting member 13, this being secured against disengagement with the slots by means of the welding or brazing indicated at 14. This support has a bearing 15 for the spindle alined with the bearing 10.

The adjusting and supporting nut 16 is arranged on the spindle between the head member and this support, a set screw 17 being provided for securing the nut in its adjusted positions. The spindle is preferably flattened at 18 to permit more effective clamping by means of the set screw. The set screw is preferably of such length that when it is retracted to release the nut it will engage with the adjacent legs, thereby holding the nut against rotation so that the spindle may be raised or lowered.

The housing 19 is provided for the lower end of the spindle and is arranged through a hole 71 in the tie plate 7 and engaged with the lower end of the bearing on the supporting plate. The seat 20 is provided with a spider 21 adapted to receive the upper end of the spindle as shown in Fig. 1. The spindle is shouldered at 22 and threaded at 23 above the shoulder.

The back supporting bracket 24 is arranged on the spindle to engage this shoulder and is provided with an upwardly projecting lug 25 engaging a recess 26 in the under side of the spindle, thereby accurately positioning the seat and bracket relative to each other. The nut 27 on the upper end of the spindle clamps the seat and bracket in their assembled relation upon the spindle.

The back 28 is carried by a back bar or arm 29 which is mounted on a link 30 connected to the bracket 24 for vertical pivotal adjustment by a clamping pivotal means designated generally by the numeral 31. The back bar is connected to the rear end of this link by a pivotal clamping means designated generally by the numeral 32 while the back is mounted on the back bar for pivotal adjustment of the means indicated at 33.

The back supporting means illustrated is that of my application for Letters Patent filed concurrently herewith.

Having thus described my invention what I claim as new and desire to secure by Letters Patent is:

1. In a chair, the combination of tubular angled legs having upright portions at their upper ends, a head member having a central opening therein and downwardly projecting lugs engaged in the upper ends of said legs, a tie plate disposed below said head member and provided with openings through which said legs are arranged, said tie plate engaging the legs adjacent the upper angles thereof and having an opening alined with the central opening in said head, said legs being provided with alined transverse slots intermediate said head member and tie plate, a seat provided with a threaded spindle arranged through said opening in said head member, a spindle support engaging in said slots in said legs whereby it is supported intermediate said head member and tie plate, a nut on said spindle resting upon said support, and a housing for the lower end of said spindle disposed through said opening in said tie plate and engaged with said support.

2. In a chair, the combination of tubular angled legs having upright portions at their upper ends, a head member having a central opening therein and downwardly projecting lugs engaged in the upper ends of said legs, a tie plate disposed below said head member and provided with openings through which said legs are arranged, said tie plate engaging the legs adjacent the upper angles thereof, said legs being provided with alined transverse slots intermediate said head member and tie plate, a seat provided with a threaded spindle arranged through said opening in said head member, a spindle support engaging in said slots in said legs whereby it is supported intermediate said head member and tie plate, and a nut on said spindle resting upon said support.

3. In a chair, the combination of legs, a head member having a central opening therein and downwardly projecting lugs engaged in the upper ends of said legs, a tie plate disposed below said head member and provided with openings through which said legs are engaged, said tie plate having an opening alined with the central opening in said head, said legs being provided with transverse slots intermediate said head member and tie plate, a seat provided with a threaded spindle arranged through said opening in said head member, a spindle support engaging in said slots in said legs whereby it is supported intermediate said head member and tie plate, a nut on said spindle resting upon said support, and a housing for the lower end of said spindle disposed through said opening in said tie plate and engaged with said support.

4. In a chair, the combination of legs, a head member having a central opening therein and downwardly projecting lugs engaged in the upper ends of said legs, a tie plate disposed below said head member and provided with openings through which said legs are engaged, said legs being provided with transverse slots intermediate said head member and tie plate, a seat provided with a threaded spindle arranged through said opening in said head member, a spindle support engaging in said slots in said legs whereby it is supported intermediate said head member and tie plate, and a nut on said spindle resting upon said support.

5. In a chair, the combination of a seat, a supporting spindle therefor shouldered at its upper end and threaded above said shoulder, a back supporting bracket arranged on said spindle to engage the shoulder thereof, said bracket having an upwardly projecting lug, a spider secured on the under side of said seat and engaged with said spindle, said spider being adapted to receive said lug on said bracket, and a nut on said spindle clamping the parts together.

In witness whereof I have hereunto set my hand.

REGINALD C. HUNTLEY.